(No Model.)

H. A. RUETER.
ALE OR BEER CASK.

No. 307,412. Patented Oct. 28, 1884.

Witnesses.
Fred L. Houghton
Nathan H. Chase.

Inventor.
Henry A. Rueter

UNITED STATES PATENT OFFICE.

HENRY A. RUETER, OF BOSTON, MASSACHUSETTS.

ALE OR BEER CASK.

SPECIFICATION forming part of Letters Patent No. 307,412, dated October 28, 1884.

Application filed January 18, 1884. (No model.)

*To all whom it may concern:*

Be it known that I, HENRY A. RUETER, of Boston, in the county of Suffolk and Commonwealth of Massachusetts, have invented a new and useful Improvement in Casks for Ale or Beer, of which the following is a specification.

My invention relates to the tap-hole bushing and the stopper and packing used in it; and it consists in the form given to the inside of the tap-hole bushing, and in the use of a stopper to close the tap-hole, which fills about half the length of the bushing at the inner end thereof, and a plug which fills about half the length of the bushing at the outer end, having a central chamber through it to receive the entering end of the faucet, which will form a packing around the faucet between it and the bushing when the faucet is driven in to its place.

Figure 1:
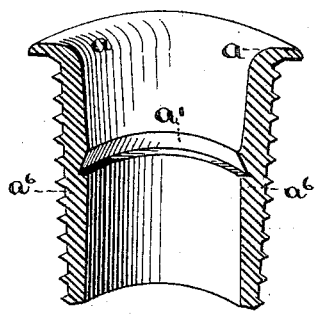

In the drawings annexed, Figure 1 shows a longitudinal section of the metallic bushing for a tap-hole in a cask as I make it. At the outer end of the bushing, on the inner side thereof, at the point marked $a\,a$, the metal is cut away entirely around it, making the opening at the outer end flaring, so that the stopper and the wooden lining can be driven into the bushing without abrading or scraping off any part of them or either of them. At about the middle of the length of the bushing, in and around the inside of it, at the point marked $a'$, I cut a small groove, the line of form of which toward the inner end of the bushing is at a right angle to the axial line of the bushing, and the line of form of the groove toward the outer end of the bushing is at an angle of about forty-five degrees to the first-named line of form of the groove, and the depth of this groove will be about one-eighth of an inch.
The object of this groove is to prevent the chambered plug used in the outer end of the bushing, which is described below, from being driven into the bushing too far, the bore of the bushing below the groove being a little smaller than above it, so as to make a shoulder which will prevent the chambered plug from being driven beyond it. The inner form of the metallic bushing from the outer end to the groove $a'$ is a cone frustum, and the inside form of the inner end of it from the groove $a'$ to its inner end is cylindrical, with a short bevel or flare at the extreme inner end.

Figure 2:
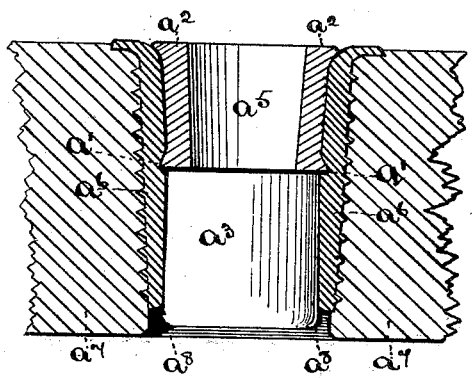

Fig. 2 shows a vertical section of a piece of the wood of the head or stave of a cask, a section of the metallic bushing, a section of the chambered plug in the metallic bushing, and a perspective of the wooden tap-hole stopper in the inner end of the metallic bushing; and it also shows the inner end of the metallic bushing widened a little to permit the expansion of the inner end of the tap-hole stopper when it becomes saturated with the contents of the cask.

$a^2$ is a chambered wooden plug, which is placed in the outer end of the metallic bushing to form a guide to the entering end of the faucet, and to form a packing between the faucet and the bushing when the faucet is driven to its place in the bushing. It is a cone-frustum block of wood, with the center of it cut away cylindrically to make a chamber or opening to receive the entering end of the faucet. This opening is marked in the drawings $a^5$, and is a little larger in diameter than the end of the faucet which is to enter it.

Figure 3:
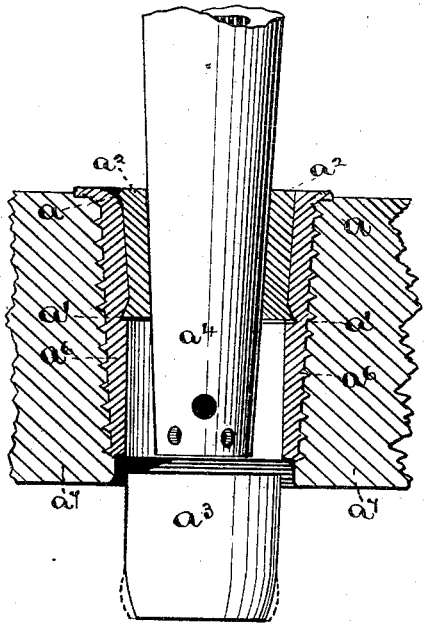

$a^3$ is a cylindrical block of wood or cork, which I call a "stopper," made to fit and completely fill and extend inward a little beyond the inner end of the metallic bushing. The inner end of this stopper will expand in and beyond the inner end of the metallic bushing, forming a head, which will have a tendency to prevent it from being forced outward by the pressure of gases within the cask. When a cask is cleaned and made ready for use, the stopper $a^3$ will be driven to its place in the metallic bushing, as shown in Fig. 2, and the chambered wooden plug $a^2$ will also be forced into its position in the metallic bushing, as shown in Fig. 2. When a cask is to be tapped, the entering end of the faucet will be placed in the opening or chamber $a^5$, and with a smart blow or two with a heavy mallet it is driven securely to its place, as shown in Fig. 3, without the least escape of the contents of the cask, whatever the inside pressure may be.

When the cask is returned to the brewery to be used again, the chambered wooden plug $a^2$ will be removed and a new stopper and a new plug placed in the metallic bushing.

$a^4$ shows a faucet driven to its place in the tap-hole bushing, the stopper $a^3$ forced by it into the inside of the cask, where it will float in the fluid, and the walls of the chambered wooden plug $a^2$ compressed between the faucet and the metallic bushing by driving the faucet so that the substance of the wood of the chambered plug is forced into and fills the groove $a'$ inside the metallic bushing. This compressing the wood of the chambered plug $a^2$ into the groove $a'$ makes a head on the inner end of the chambered plug $a^2$, which secures it in place, so that it cannot be forced out by pressure within the cask. The faucet $a^4$ is driven into the chambered wooden plug $a^2$ with such force that the friction between it and the wood of the plug is sufficient to retain it against the pressure in the inside of the cask.

$a^6$ represents the wall of the metallic bushing, with a screw-thread on the outside of it by which it is entered into and secured in the wooden stave or head-piece of the cask.

$a^7$ represents the wood of the stave or head-piece in a cask.

$a^8$ marks the short bevel or flare at the inner end of the metallic bushing and the expansion of the inner end of the wooden stopper $a^3$.

It is obvious that the improved form of the inside of the outer end of the metallic bushing will admit the driving in of the stopper $a^3$ and of the chambered plug $a^2$ without abrading or injuring either of them.

The groove $a'$, and the shoulder formed at the inner side of it, provides a stop to prevent the chambered wooden plug $a^2$ from being driven in too far, and also a place for a head on the inner end of the chambered plug, which is partly covered by the shoulder formed by the inner line of the groove $a'$ protecting a part of the area of it from pressure, so that there will be no danger of the chambered plug with the faucet in it being forced away by pressure inside the cask.

I do not claim anything which I have claimed in my application for a patent allowed October 3, 1883; but I do claim as new and my invention—

1. In an ale or beer cask, a metallic bushing having a flaring outer end, $a$, and an interior groove, $a'$, midway of its bore, in combination with a chambered plug, $a^2$, constructed to extend to and fit into the groove $a'$, substantially as described.

2. In an ale or beer cask, in combination with a tap-hole bushing having the flare $a$ at the outer end of its bore and the groove $a'$ in the middle of its bore, the tap-hole stopper $a^3$, and the chambered plug $a^2$, all substantially as described, for the purposes set forth.

HENRY A. RUETER.

Witnesses:
CHS. HOUGHTON,
FREDK. L. HOUGHTON.